US008352480B2

(12) United States Patent
Iwuchukwu

(10) Patent No.: US 8,352,480 B2
(45) Date of Patent: Jan. 8, 2013

(54) METHODS, APPARATUSES AND COMPUTER PROGRAM PRODUCTS FOR CONVERTING A GEOGRAPHICAL DATABASE INTO A MAP TILE DATABASE

(75) Inventor: Tochukwu Iwuchukwu, Mountain View, CA (US)

(73) Assignee: Nokia Corporation, Espoo (FI)

( * ) Notice: Subject to any disclaimer, the term of this patent is extended or adjusted under 35 U.S.C. 154(b) by 126 days.

(21) Appl. No.: 12/973,514

(22) Filed: Dec. 20, 2010

(65) Prior Publication Data

US 2012/0158762 A1 Jun. 21, 2012

(51) Int. Cl.
*G06F 7/00* (2006.01)
*G06F 17/30* (2006.01)

(52) U.S. Cl. ....................................................... 707/756
(58) Field of Classification Search ........................ None
See application file for complete search history.

(56) References Cited

U.S. PATENT DOCUMENTS

| | | | |
|---|---|---|---|
| 5,953,722 A | 9/1999 | Lampert et al. | |
| 5,963,956 A | 10/1999 | Smartt | |
| 6,879,980 B1 | 4/2005 | Kothuri et al. | |
| 7,152,071 B2 | 12/2006 | Xing | |
| 7,397,811 B2 * | 7/2008 | Green | 370/432 |
| 7,539,666 B2 | 5/2009 | Ashworth et al. | |
| 7,580,927 B1 | 8/2009 | Abugov et al. | |
| 7,689,621 B1 | 3/2010 | Huber et al. | |
| 2006/0184519 A1 * | 8/2006 | Smartt | 707/3 |
| 2006/0218114 A1 * | 9/2006 | Weare et al. | 707/1 |
| 2009/0027418 A1 * | 1/2009 | Maru et al. | 345/629 |

FOREIGN PATENT DOCUMENTS

| | | |
|---|---|---|
| EP | 1473543 A2 | 11/2004 |
| WO | WO 2009/137967 A1 | 11/2009 |

OTHER PUBLICATIONS

International Searching Authority, "International Search Report and Written Opinion for International Application No. PCT/IB2011/054612", mailed Jun. 5, 2012, 13 pages, The Swedish Patent and Registration Office, Sweden.
Guttman, Antonin, "R-Trees: A Dynamic Index Structure for Spatial Searching", Copyright 1984, pp. 47-57, Association for Computing Machinery, USA.
Author Unknown, "Oracle8i Spatial User's Guide and Reference", pp. 5-9, Oracle Corporation, Copyright 1999, <http://download.oracle.com/docs/html/A67295_01/sdo_intr.htm>.
Author Unknown, "QuadTiles", pp. 1-11, OpenStreetMap Wiki, <http://wiki.openstreetmap.org/wiki/QuadTiles>, page was last modified on Feb. 9, 2011.

* cited by examiner

*Primary Examiner* — Uyen T. Le
(74) *Attorney, Agent, or Firm* — Alston & Bird LLP

(57) ABSTRACT

An apparatus for converting geographical geometrical content of a geographical database to map tiles may include a processor and a memory storing executable computer code that cause the apparatus to at least perform operations including modifying a geographical database based in part on adding items of data arranged in fields based on analyzing values corresponding to geometry information. The geometry information is associated with records of the geographical database. The computer program code may further cause the apparatus to determine a set of tiles at a predetermined zoom level including geographical information of respective records and may update the records to include data associated with minimum and maximum x and y values of the tiles. The computer program code may further cause the apparatus to determine minimum and maximum x and y values that define a rectangular block(s) of map tiles. Corresponding computer program products and methods are also provided.

20 Claims, 9 Drawing Sheets

| (3,0) | (3,1) | (3,2) | (3,3) |
|---|---|---|---|
| (2,0) | (2,1) | (2,2) | (2,3) |
| (1,0) | (1,1) | (1,2) | (1,3) |
| (0,0) | (0,1) | (0,2) | (0,3) |

Zoom 2

| (1,0) | (1,1) |
|---|---|
| (0,0) | (0,1) |

Zoom 1

| (0,0) |
|---|

Zoom 0

FIG. 1.

| $(x_2, y_2)$ | $(x_2+1, y_2)$ | ... | $(x_2+n, y_2)$ |
| --- | --- | --- | --- |
| $(x_2, y_2+1)$ | $(x_2+1, y_2+1)$ | ... | $(x_2+n, y_2+1)$ |
| ... | ... | | ... |
| $(x_2, y_2+m)$ | $(x_2+1, y_2+m)$ | | $(x_2+n, y_2+m)$ |

FIG. 5.

| (1600, 3200) | (1601, 3200) | ... | (1615, 3200) |
| --- | --- | --- | --- |
| (1600, 3201) | (1601, 3201) | ... | (1615, 3201) |
| ... | ... | ... | ... |
| (1600, 3215) | (1601, 3215) | ... | (1615, 3215) |

FIG. 6.

METHODS, APPARATUSES AND COMPUTER PROGRAM PRODUCTS FOR CONVERTING A GEOGRAPHICAL DATABASE INTO A MAP TILE DATABASE

TECHNOLOGICAL FIELD

An embodiment of the invention relates generally to database technology and more particularly relates to a method, apparatus and computer program product for optimizing a database to improve database performance for retrieval of location or map data by converting a geographic database into a map tile database.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to the delivery of mapping services to a mobile terminal of a user. The mapping service may provide map data and location data requested by media or communication applications of the mobile terminal.

Currently, map or location data provided by mapping services is typically stored in a geographical database. The geographical database may be able to store, query and manipulate geographic information and spatial data that may be optimized for two or three dimensions. The spatial data may be stored as vector data in the form of geometric data such as, for example, a point, line, polygon, etc. and may have an associated spatial reference system. In this regard, the spatial data may be associated with coordinates such as latitude and longitude coordinates corresponding with locations or objects in the real world. As an example of spatial data, consider a highway which may be depicted as a two-dimensional object that contains lines, points and polygons that may represent towns, streets and boundaries such as, counties, states, etc. A map of the highway is the visualization of geographic information. The data that indicates the locations (e.g., latitude and longitude) of these rendered objects may be the spatial data. As such, geographical databases may store geometry data associated with streets, highways, waterways, oceans, landmarks, railroads, administrative area boundaries, etc. It should be pointed out that geographical databases may include records to represent the locations of objects or places in the real world.

At present, existing systems may utilize map tiles in order to facilitate fast retrieval of geographic data from a geographic database. One such technique for rendering the map tiles is tessellation. In this regard, existing systems may utilize tessellation to store data for specific locations by dividing the data up by location and partitioning the world into tiles. In other words, the geometric data corresponding to the real world may be partitioned into tiles and then a tile index for accessing the geographic database may be created based on the tiles.

This technique may be beneficial for mapping systems because mapping systems typically retrieve data in tile units from a geographical database. While this approach may provide good performance for data retrieval with respect to mapping systems, it may also incur high overhead in computing storage costs and computing processing costs. As such, one drawback with this approach of geometric data retrieval is that it may result in heavy use of computing storage resources (e.g., disk and memory) and processing resources for tile indexes. For instance, geographical data corresponding to a map tile may be zoomed according to a zoom level. As such, given a zoom level z, the number of map tiles at zoom z is $4^z$. As an example, consider FIG. 1 relating to the tile system.

Referring to FIG. 1, at zoom level 0, the whole world may be covered by one tile (e.g., $4^z=4^0=1$). At zoom level 1, the single tile from zoom 0 is split into four (e.g., $4^z=4^1=4$). At zoom level 2, each of the four tiles from zoom 1 is further split into four (e.g., $4^z=4^2=16$), so on and so forth. In other words, to generate tiles for zoom level $z_i$ every tile in zoom level $z_{i-1}$ may be split into four, as shown in FIG. 1. Hence, each tile at a given zoom level may be equivalent to a rectangular block of tiles at higher zoom levels. For instance, the single tile x=0, y=0 at zoom level 0 may be equivalent to all four tiles at zoom level 1. Similarly, the tile x=0, y=1 at zoom level 1 may be equivalent to the tiles x=0, y=2; x=1, y=2; x=0, y=3; x=1, y=3 at zoom level 2.

In a system with a maximum zoom level of 18, the number of tiles at zoom level 18 is $4^{18}$, resulting in over 64 billion tiles. In an instance in which the size of a leaf index node may be four bytes (e.g., the size of an integer pointer address), then for a zoom of 18 tiles, the total size of the leaf index nodes alone is roughly 256 gigabyte (GB). This is a huge amount of space overhead especially in consideration of the size of the database itself. For instance, the Navteq™ Streets database for the United States has approximately 27 million records with a total disk space size of 11 GB.

To resolve the disk space issue, existing tile-indexing systems typically make tile size tradeoffs when indexing geographical data. Smaller tiles at higher zoom levels contain small amounts of geographical data per tile and hence have better selectivity for queries requesting map data. However, using smaller tiles in this manner typically requires large amounts of disk space to maintain the resulting indexes. For instance, smaller tiles may result in more segment traversals requiring more space to be used. On the other hand, larger tiles at lower zoom levels typically contain large amounts of geographical data per tile and thus may have worse selectivity for queries requesting map data than smaller tiles. However, larger tiles typically require smaller amounts of disk space to maintain the resulting indexes. For instance, at zoom level 9, the disk space for leaf index nodes is only about one megabyte (MB) but may result in poor performance for tile requests at zoom level 18, for instance, because the query for map data may typically return a large number of records as there are $2^{18}$ (over 260,000 tiles) zoom 18 tiles contained in each zoom 9 tile.

In view of the foregoing drawbacks of existing tile-indexing systems, it may be beneficial to provide an alternative mechanism for accessing geographic databases via tiles that may utilize computing storage resources more efficiently for tile indexes with respect to geographic databases.

BRIEF SUMMARY

A method, apparatus and computer program product are therefore provided that may convert a geographical database into a map tile database by generating a loose tile representation of the geographical database. An example embodiment may not suffer from the heavy use of computing storage (e.g., disk and memory) as do some previously known tile representation approaches. An example embodiment may utilize a tile index that has a size that is a function of the cardinality of the geographical database since the tile index may be created directly from record field data, in contrast with earlier solutions in which the size of a tile index may be a function of the number of tiles that cover the world.

By creating and using an index with integer-type columns (e.g., xmin, ymin, xmax, ymax) for retrieving tile geographical data, an example embodiment may facilitate the use of a geographic database(s) without the usual requirement of spatial database management systems (e.g. PostgreSQL).

Rather than tessellate the world and create a tile index from the resulting tessellation to facilitate fast retrieval of data from a geographical database, an example embodiment may instead modify the geographical database by modifying each geographical record in the geographical database with additional data fields that may indicate the candidate tiles to which the record's geometry may intersect.

In this regard, the resulting tile index generated by an example embodiment may be derived from the additional data fields added to the records, and as a result the tile index of an example embodiment may occupy space that is dependent on the cardinality of the geographical database as opposed to current tile-indexing systems in which the tile index is based on tessellation results and hence the size of the index may be dependent on the number of tiles resulting from the tessellation process (e.g., the number of tiles that cover the world) utilized by the current tile-indexing systems.

In order to facilitate better use of storage for indexing, an example embodiment may utilize a loose tile representation for geographical records of a database. This loose representation may be captured by an exemplary embodiment generating a rectangular tile block to represent the candidate tiles that the geometry corresponding to a given record may intersect. In this regard, in an instance in which an example embodiment may determine that the geometry corresponding to a record(s) intersects with a tile, then that tile may be guaranteed to be in the tile block of the corresponding record(s). However, an example embodiment may determine that some tiles may exist in that tile block for which the geometry corresponding to the record(s) may not intersect.

The exemplary embodiments may also generate a query that may be sent to a geographical database for geographical data in a tile. In this regard, an exemplary embodiment may determine that the tile block for a geographical record in the database is only a loose tile definition for the record. As such, in resolving the query, an example embodiment may determine that each record in the result or response to the query may need to be further examined to determine whether the geometry corresponding to the record(s) actually intersects the tile referenced in the query.

By utilizing an example embodiment, the usual tile size tradeoff problems encountered by current tile-indexing schemes may be alleviated. In this regard, an example embodiment may allow convenient translation of a query for a tile at any zoom level into a query for the relevant tiles at the zoom level that was used to transform the geographical database and may then retrieve the relevant geographical data from the geographical database.

An example embodiment of the invention may utilize smaller indexes which may translate to faster record retrieval times. As such, an example embodiment may yield better database performance. This, in turn, may enhance the overall performance of network devices (e.g., a server) that may enable provision of map services which may render map tiles as well as perform other map-based services that may be based on geographical databases such as, for example, retrieving and rendering live traffic data on a map. As such, an example embodiment may yield better database performance for map servers. For instance, an example embodiment may generate a tile index for the Navteq™ streets database that may use a memory (e.g., disk space) of 806 MB, which is an improvement over existing approaches. Additionally, an example embodiment may also improve response times to requests by a client (e.g., a mobile terminal) for location or map data.

In one example embodiment, a method for converting geographical geometrical content of a geographical database to map tiles is provided. The method may include modifying a geographical database based in part on adding items of data arranged in fields based on analyzing values corresponding to geometry information associated with geographical records of the geographical database. The method may further include determining a set of tiles, for each of the records, at a predetermined zoom level that includes at least a portion of the geographical information of respective records and updating each of the records to include data associated with minimum and maximum x and y values of the tiles that correspond to the geometrical information of a corresponding record. The method may further include determining that the minimum and maximum x and y values define one or more rectangular blocks of map tiles.

In another example embodiment, an apparatus for converting geographical geometrical content of a geographical database to map tiles is provided. The apparatus may include a processor and a memory including computer program code. The memory and computer program code are configured to, with the processor, cause the apparatus to at least perform operations including modifying a geographical database based in part on adding items of data arranged in fields based on analyzing values corresponding to geometry information associated with geographical records of the geographical database. The computer program code may further cause the apparatus to determine a set of tiles, for each of the records, at a predetermined zoom level that includes at least a portion of the geographical information of respective records and updating each of the records to include data associated with minimum and maximum x and y values of the tiles that correspond to the geometrical information of a corresponding record. The computer program code may further cause the apparatus to determine that the minimum and maximum x and y values define one or more rectangular blocks of map tiles.

In another example embodiment, a computer program product for converting geographical geometrical content of a geographical database to map tiles is provided. The computer program product includes at least one computer-readable storage medium having computer-executable program code instructions stored therein. The computer-executable program code instructions may include program code instructions configured to modify a geographical database based in part on adding items of data arranged in fields based on analyzing values corresponding to geometry information associated with geographical records of the geographical database. The program code instructions may also determine a set of tiles, for each of the records, at a predetermined zoom level that includes at least a portion of the geographical information of respective records and updating each of the records to include data associated with minimum and maximum x and y values of the tiles that correspond to the geometrical information of a corresponding record. The program code instructions may also determine that the minimum and maximum x and y values define one or more rectangular blocks of map tiles.

Embodiments of the invention may enhance cost efficiencies related to overhead in computing storage and processing associated with tile indexes of geographical databases. In this manner, an example embodiment may reduce the size of geographical data stored in a geographical database which may enable faster data retrieval. As such, mobile terminal users may enjoy improved mobile device functionality.

BRIEF DESCRIPTION OF THE SEVERAL VIEWS OF THE DRAWINGS

Figure 2:
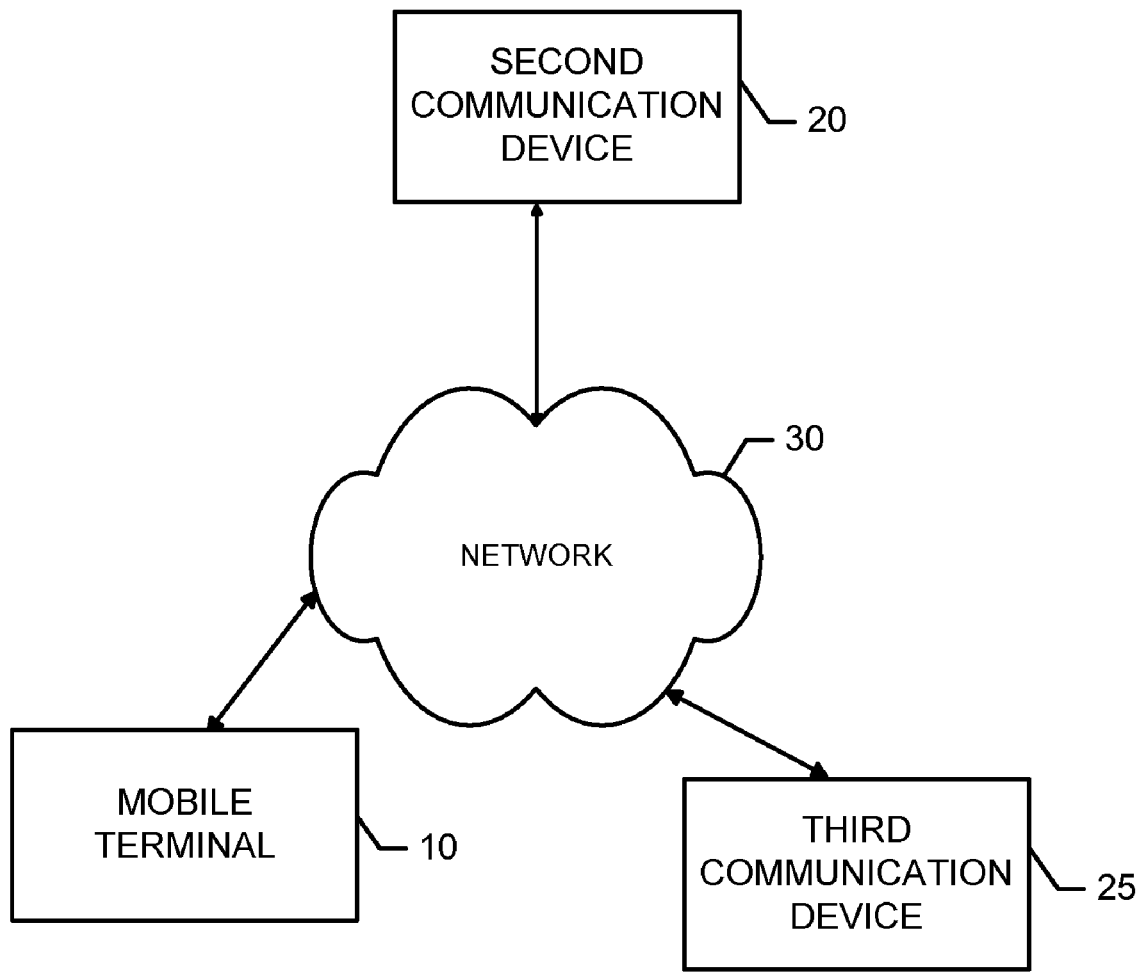
Figure 3:
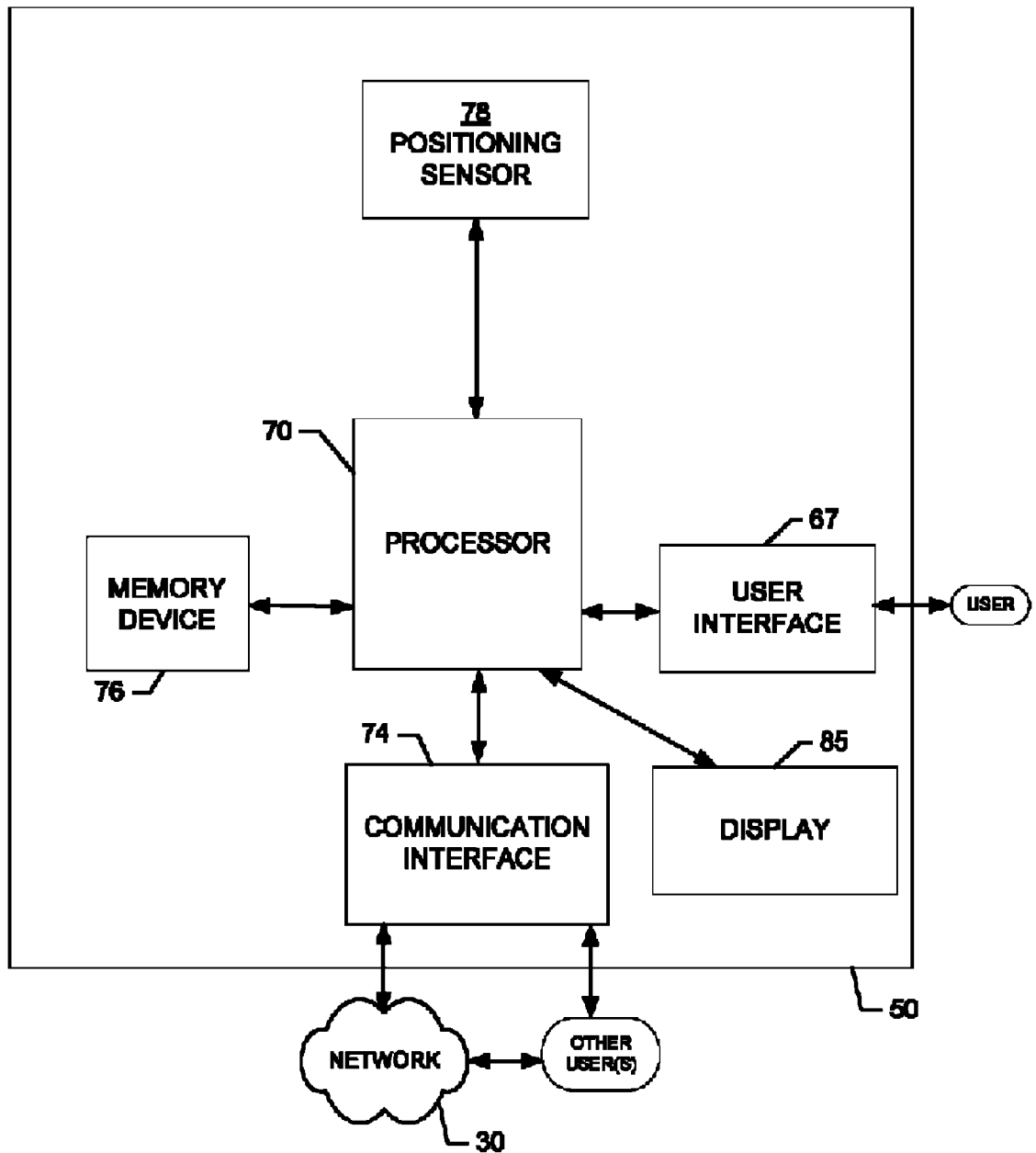
Figure 4:
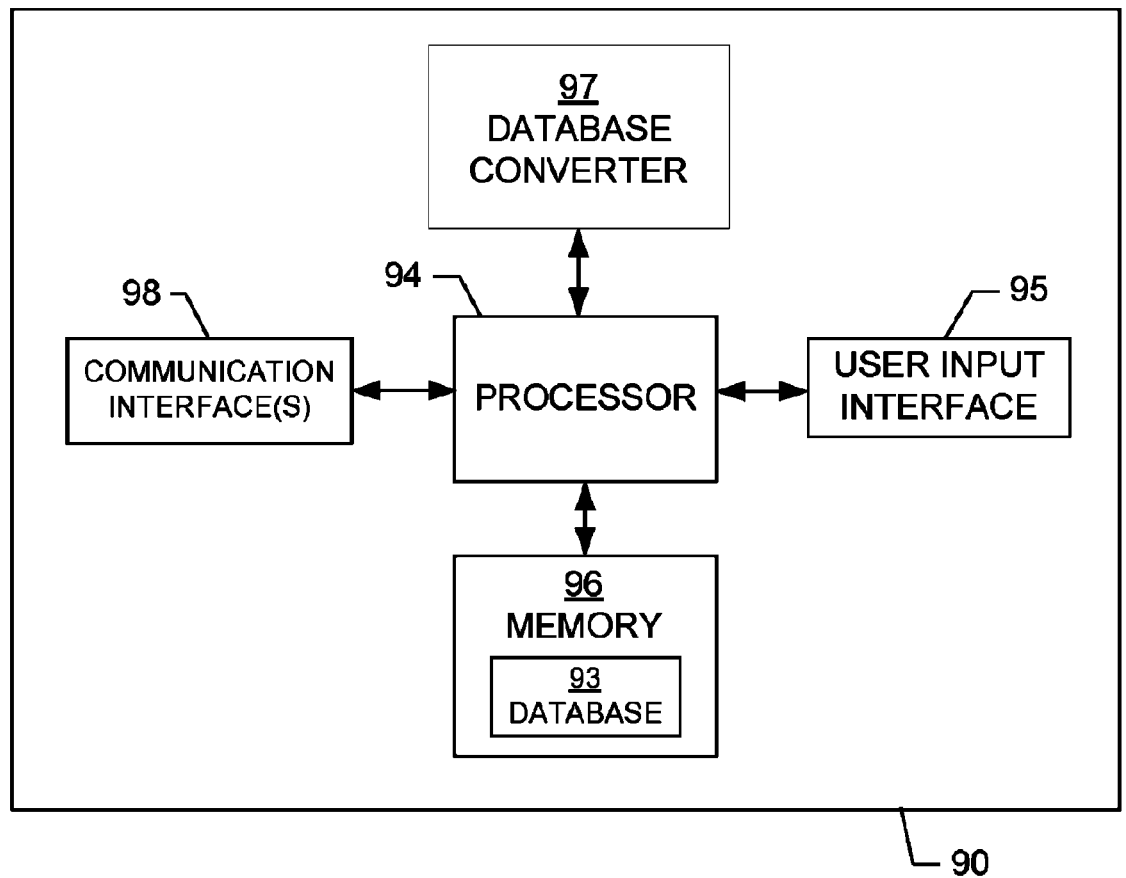
Figure 7:
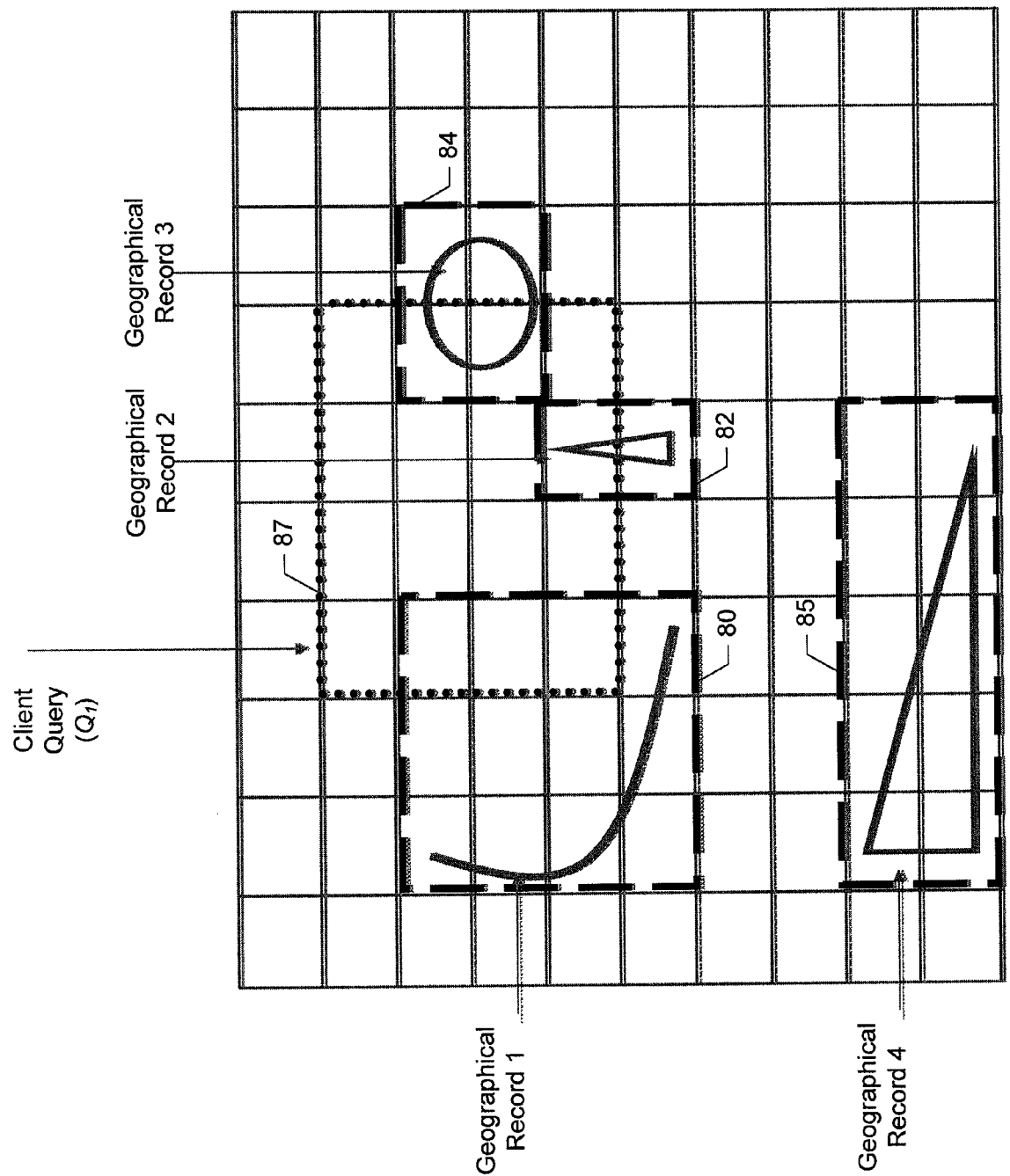
Figure 8:
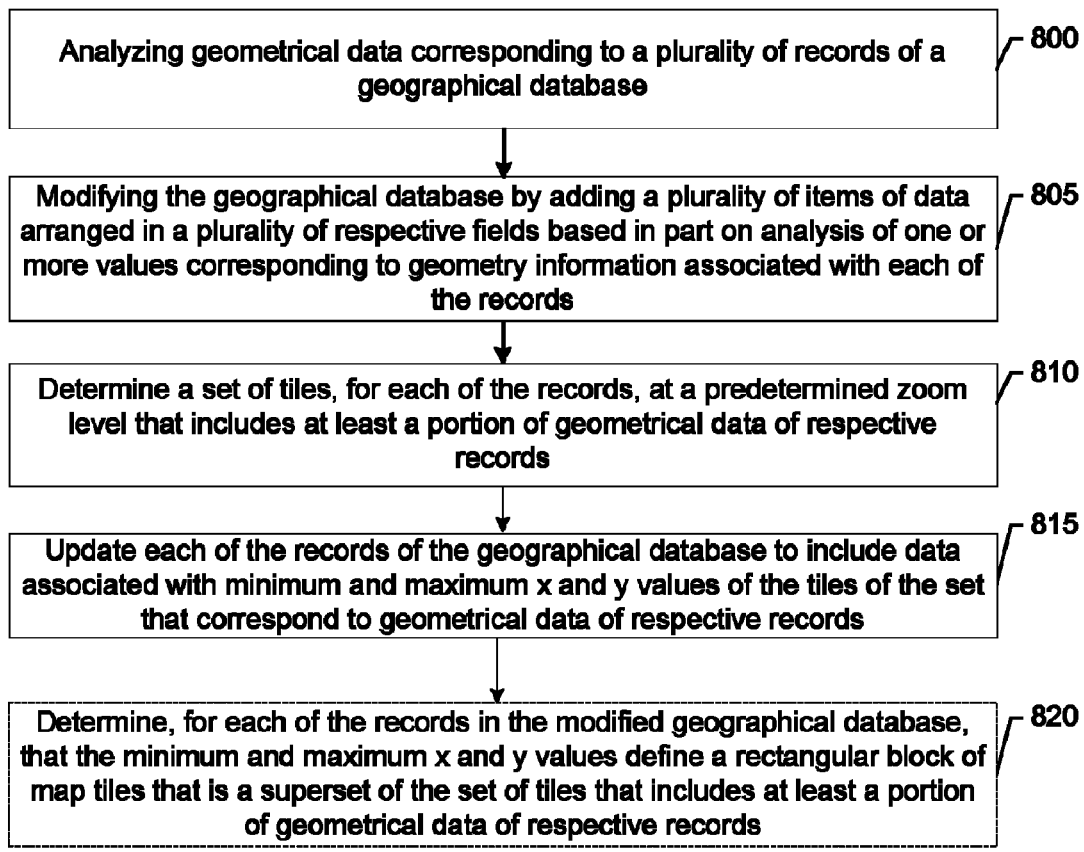
Figure 9:
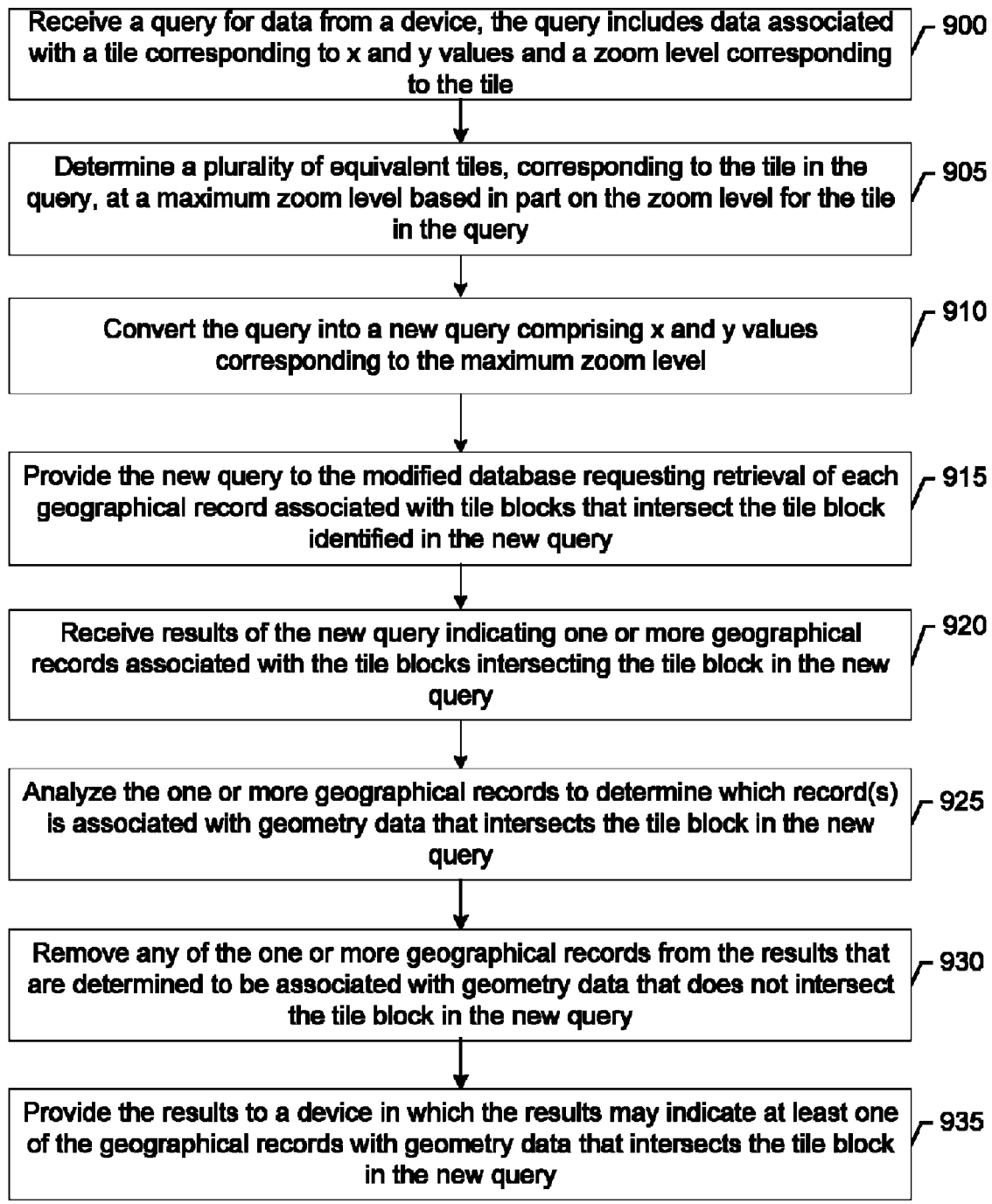

Having thus described the invention in general terms, reference will now be made to the accompanying drawings, which are not necessarily drawn to scale, and wherein:

FIG. 1 is a diagram of the tile system corresponding to one or more zoom levels;

FIG. 2 is a schematic block diagram of a system according to an example embodiment of the invention;

FIG. 3 is a schematic block diagram of an apparatus according to an example embodiment of the invention;

FIG. 4 is a schematic block diagram of a network entity according to an example embodiment of the invention;

FIG. 5 is a diagram of a tile mapped from one zoom level to a higher zoom level according to an example embodiment of the invention;

FIG. 6 is a diagram of a tile block according to an example embodiment of the invention;

FIG. 7 is a diagram of map tiles and geographical records based in part on a query according to an example embodiment of the invention;

FIG. 8 is a flowchart for converting geographical content corresponding to geometrical data of a geographical database to one or more map tiles according to an example embodiment of the invention; and FIG. 9 is a flowchart for executing one or more queries on a modified geographical database according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a loose tile block may refer to a rectangular block of tiles defining each geographical record(s) even though geometry corresponding to a geographical record(s) may not actually intersect every tile in the rectangular block.

FIG. 2 illustrates a generic system diagram in which a device such as a mobile terminal 10 is shown in an example communication environment. As shown in FIG. 2, an embodiment of a system in accordance with an example embodiment of the invention may include a first communication device (e.g., mobile terminal 10) and a second communication device 20 capable of communication with each other via a network 30. In some cases, an embodiment of the invention may further include one or more additional communication devices, one of which is depicted in FIG. 2 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 2 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) (which in E-UTRAN are referred to as node-Bs) that is a part of one or more cellular or mobile networks or an access point that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 2, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 3) capable of employing an embodiment of the invention.

FIG. 3 illustrates a schematic block diagram of an apparatus according to an example embodiment of the invention. An exemplary embodiment of the invention will now be described with reference to FIG. 3, in which certain elements of an apparatus 50 are displayed. The apparatus 50 of FIG. 3 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, an embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments.

Referring now to FIG. 3, an apparatus according to an exemplary embodiment is provided. The apparatus 50 may include or otherwise be in communication with a processor 70, a user interface 67, a communication interface 74, a memory device 76, a display 85, and a positioning sensor 78. The memory device 76 may include, for example, volatile and/or non-volatile memory. The memory device 76 may be configured to store information, data, files, applications, instructions or the like for enabling the apparatus to carry out various functions in accordance with an exemplary embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.). The memory device 76 may include one or more databases. In an example embodiment, the memory device 76 may be a tangible memory device that is not transitory. The memory device 76 may store map data and/or data associated with one or more locations of objects and/or places or the like.

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The positioning sensor 78 may be in communication with processor 70. The positioning sensor 78 may include, for example, a global positioning system (GPS) sensor, an assisted global positioning system (Assisted-GPS) sensor, a Bluetooth (BT)-GPS mouse, or other GPS or positioning receivers or the like. In one embodiment, however, the positioning sensor may include a pedometer or inertial sensor. In another embodiment, the positioning sensor may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the positioning sensor as described below. Thus, in examples in which software is employed, a device or circuitry (e.g., processor 70 in one example) executing the software forms the structure associated with such means.

In this regard, for example, the positioning sensor 78 may be configured to generate, among other things, GPS data that may be used by the processor of the apparatus to determine the location of the apparatus. The data associated with the location may but need not include information related to one or more of longitude, latitude and altitude coordinates of the apparatus. In an example embodiment, the positioning sensor 78 may send one or more queries to a network device for location data (e.g., map data) and upon receipt of the location data from the network device, the positioning sensor 78 may utilize the location information (e.g., map data) to determine a location of a place, object or the like. In an example embodiment, the positioning sensor 78 may send the determined location information to one or more applications of the apparatus 50.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to embodiments of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70, which may otherwise be a general purpose processing element or other functionally configurable circuitry if not for the specific configuration provided by the instructions, to perform the algorithms and operations described herein. However, in some cases, the processor 70 may be a processor of a specific device (e.g., a mobile terminal) adapted for employing an embodiment of the invention by further configuration of the processor 70 by instructions for performing the algorithms and operations described herein.

In an exemplary embodiment, the processor 70 may be configured to operate a connectivity program, such as a browser, Web browser or the like. The browser may execute one or more applications such as, for example, web applications. In this regard, the connectivity program may enable the apparatus 50 to transmit and receive Web content, such as for example location-based content or any other suitable content, according to a Wireless Application Protocol (WAP), for example. The browser may utilize Hypertext Markup Language (HTML), JavaScript or any other suitable programming languages for handling Web content. The processor 70 may also be in communication with a display 85 and may instruct the display to illustrate any suitable information, data, content (e.g., media content) or the like.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated.

Referring now to FIG. 4, a block diagram of an exemplary embodiment of a network entity such as, for example, network device 90 is provided. As shown in FIG. 4, the network device 90 (e.g., a server) may include a processor 94 and an associated memory 96. The memory 96 may comprise volatile and/or non-volatile memory, and may store content, data and/or the like. For example, the memory may store content, data, information, and/or the like transmitted from, and/or received by, the network device. Also for example, the memory 96 may store client applications, instructions, computer program code and/or the like for the processor 94 to perform the various operations of the network device in accordance with embodiments of the invention, as described above. The memory 96 may include one or more databases, such as, for example, database 93. In one example embodiment, the memory 96 may be embodied in the network device 90. In another alternative example embodiment, the memory 96 may be external to the network device 90. The database 93 may be a geographical database (also referred to herein as geodatabase 93 or geographical database 93) in which geographical data may be converted to one or more map tiles by the database converter 97 in the manner described more fully below. In this regard, the geographical database may include at least one column that defines the geometry (e.g., points, lines, polygons, etc.) for corresponding records associated with locations (e.g., one or more maps) of places, objects or the like (e.g., cities, highways, bridges, etc.) in the real world. In this regard, the records may be associated with coordinates such as, for example, latitude and longitude coordinates corresponding to the places, objects or the like in the real world. The geographical database may receive one or more queries from the processor 94 and/or the database converter 97 for retrieval of data in the geographical database as well as for any other suitable reasons. In an example embodiment, the database 93 may include, but is not limited to, geographical data associated with one or more streets (e.g., corresponding to road geometry), oceans (e.g., corresponding to water geometry), administrative boundaries (e.g., corresponding to boundary geometry for countries, states, counties, cities, zip codes, etc.) or any other suitable geographical data.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network entity to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an example embodiment, the processor 94 may be embodied as, include or otherwise control the database converter 97. The database converter 97 may be any means such as a device or circuitry operating in accordance with software or otherwise embodied in hardware or a combination of hardware and software (e.g., processor 94) operating under software control, the processor 94 embodied as an ASIC or FPGA specifically configured to perform the operations described herein, or a combination thereof) thereby configuring the device or structure to perform the corresponding functions of the database converter 97 as described below. Thus, in an example in which software is employed, a device or circuitry (e.g., the processor 94 in one example) executing the software forms the structure associated with such means.

The database converter 97 may convert geographical data associated with coordinates such as, for example, latitude and longitude coordinates (associated with locations (e.g., one or more maps) of places or objects or the like in the real world) corresponding to one or more records in a geographical database(s) (e.g., database 93) into one or more map tiles. The map tiles may be defined by one or more corresponding loose tile blocks that may be associated with records, in the manner described more fully below.

In this regard, the database converter 97 may enable reduction of the size of computing storage (e.g., memory) and minimize processing requirements that may be required to maintain tile indexes on geographical databases. To achieve this, the database converter 97 may take as input a geographical database D and a map zoom level $z_{input}$. For each geographical record R in the geographic database D, the database converter 97 may determine the set of tiles $S=\{T_i\}$ at zoom level $z_{input}$ such that the geometry (e.g., a point(s), line(s), polygon)(s), etc.), corresponding to a location of a place, area or object, for record R intersects with $T_i$.

The database converter 97 may then add an entry for R indicating the smallest rectangular block B of tiles on a corresponding map such that $B \supseteq S$, where B denotes a loose tile block representation for the record R. In order to execute a query to retrieve all geographical records R whose geometry may intersect with a given tile T, the database converter 97 may identify all records R in the geographic database D such that the loose tile block B (e.g., a rectangular tile block B) for R intersects with T. In this regard, the database converter 97 may convert geographic content corresponding to geometric data (e.g., points, lines, polygons, etc.) of a geographic database to one or more corresponding map tiles, as described more fully below. The conversion of the geographic content to corresponding map tiles according to an example embodiment may reduce computing storage capacity and processing requirements.

For purposes of illustration and not of limitation consider the following as an example in which the database converter 97 may convert geographical content corresponding to geometric data in a geographical database to one or more map tiles.

In this regard, the database converter 97 may implement a database optimization procedure and may analyze at least two input variables: (1) a geographical database D; and (2) a zoom level $z_{input}$. The output of the database optimization procedure may be a new or modified geographical database $D_1$. In this regard, the database converter 97 may set the value of $z_{input}$ to be the maximum zoom level (e.g., a maximum zoom level of 18, 20, etc.) in a map system. The geographical database D may include a column(s) named geometry that defines the geometry (e.g. points, lines, polygons, etc.) corresponding to one or more records. The geometry may correspond to one or more coordinates such as, for example, longitude and latitude coordinates associated with location data (e.g., map data). An example of the geographic database D may be database 93 in one example embodiment. In this regard, the database 93 may include geographic content (e.g., geometrical location data (e.g., map data)) associated with locations of places or objects in the real world such as for example streets, highways (e.g., road geometry), oceans (e.g., water geometry), one or more administrative boundaries (e.g., boundary geometry for countries, states, counties, cities and zip codes) and any other suitable geographic data.

Modifying the Database Structure

The database converter 98 may implement the database optimization procedure and add at least four new columns to the geographic database D. The columns added to the geographic database D by the database converter 98 may be denoted as xmin, ymin, xmax, and ymax. Given one or more records R of the geographic database D and one or more values of a geometry field in record(s) R, the database converter 97 may define the fields as follows:

xmin: the minimum x value of all tiles at zoom level $z_{input}$ that may include some portion of the geometry of R;

ymin: the minimum y value of all tiles at zoom level $z_{input}$ that may include some portion of the geometry of R;

xmax: the maximum x value of all tiles at zoom level $z_{input}$ that may include some portion of the geometry of R; and ymax: the maximum y value of all tiles at zoom level $z_{input}$ that may include some portion of the geometry of R, where, xmin, ymin, xmax and ymax represents the loose tile block (e.g., a rectangular tile block) for the geographic record R.

Processing and Updating the Database

For each record R in the geographic database D (e.g., database 93), the database converter 97 may perform the following: (1) compute the set of tiles S={$T_i$} at zoom level $z_{input}$ that may include some portion of the geometry of a record(s) R (e.g., a record associated with geometry (e.g., latitude and longitude coordinates) for a street, etc.); and (2) update a record(s) R as follows:

Set R.xmin=the minimum x value of tiles in S
Set R.ymin=the minimum y value of tiles in S
Set R.xmax=the maximum x value of tiles in S
Set R.ymax=the maximum y value of tiles in S In this regard, the database converter 97 may determine that the values of R.xmin, R.ymin, R.xmax, R.ymax may define a loose block (e.g., a rectangular block) of tiles that is a superset of S.

Executing Queries on the Modified or New Database

A client (e.g., apparatus 50) may issue a query Q for a tile in the new or modified geographical database $D_1$ (e.g., database 93). In response to receipt of the query Q by the network device 90, the database converter 97 may perform the following:

SELECT*from $D_1$ WHERE x=$x_i$ AND y=$y_i$ AND zoom=$z_i$.

In other words, the database converter 97 may select each of the records of the modified or new geographical database $D_1$, where x=$x_i$ and y=$y_i$ and zoom=$z_i$. It should be pointed out that in one example embodiment the positioning sensor 78 of the apparatus 50 may generate and send the query Q to the network device 90.

In this regard, the database converter 97 may first compute the set U of tiles such that the tiles in set U are at the maximum zoom level $z_{max}$ (or the zoom level that was chosen as input (e.g., $z_{input}$) to the database optimization procedure) and that may be included in the tile referenced in the client query Q (e.g., the x=$x_i$, y=$y_i$, zoom=$z_i$). Due to the hierarchical nature of map tiles, the database converter 97 may compute, for any map tile T at any zoom level, all tiles at the maximum zoom level $z_{max}$ that may be included in the tile T. In this regard, defining the maximum zoom level (e.g., a zoom level of 18, 20, etc.) as the input zoom level to the database optimization procedure may be used in part to determine the set of all tiles at zoom $z_{max}$ that may be included in the tile T. The database converter 97 may define $U_{left}$ as the x value of the leftmost tile in the set U of tiles, $U_{right}$ as the x value of the rightmost tile in set U, $U_{top}$ as the y value of the topmost tile in set U and $U_{bottom}$ as the y value of the bottommost tile in set U.

The database converter 97 may then convert query Q into a new query $Q_1$ where query $Q_1$ may be determined by the following:

SELECT*FROM $D_1$ WHERE $U_{left}$≦xmax AND $U_{right}$≧xmin AND $U_{top}$≦ymax AND $U_{bottom}$≧ymin.

In other words, the database converter 97 may select each of the records from the new or modified geographical database $D_1$ where $U_{left}$≦xmax and $U_{right}$≧xmin and $U_{top}$≦ymax and $U_{bottom}$≧ymin.

The database converter 97 may define C as the set of candidate records returned based on executing query $Q_1$. For each record R in candidate records C, the database converter 97 may determine if the tile identified by x=$x_i$, y=$y_i$, zoom=$z_i$ includes some portion of the geometry of a record(s) R. In an instance in which the database converter 78 determines that the result is false, the database converter 97 may remove a corresponding record(s) R from the candidate record(s) C. In this regard, the database converter 97 may return the final candidate record(s) C to the client (e.g., apparatus 50) that sent the query Q to the network device 90. In this manner, the client may utilize the data (e.g., map data) associated with the records.

Referring now to FIG. 5 an example embodiment for mapping a tile from one zoom level to a higher zoom level is provided. In this regard, given a tile T=($x_1$, $y_1$) at zoom level $z_1$, the block of tiles contained in T at zoom level $z_2$ where $z_2$≧$z_1$ may be defined by the database converter 97 as follows:

Define $z_2$−$z_1$=z, then

Equation 1 is defined as: $x_2 = 2 \times z \times x_1$;

Equation 2 is defined as: $y_2 = 2 \times z \times y_1$; and

Equation 3: $n = m = 2 \times z - 1$.

It should be pointed out that the tile T may be included in a query Q from a client (e.g., apparatus 50) to the network device 90 for corresponding location data (e.g., map data).

By utilizing these equations, the database converter 97 may generate the mapped tile of FIG. 5 that may be utilized for any zoom level in order to map a tile from one zoom level (e.g., zoom level 1) to a higher zoom level (e.g., zoom level 15) according to an example embodiment.

For purposes of illustration and not of limitation regarding an example manner in which the database converter 97 may convert geographical content corresponding to geometrical data of a geographic database to one or more corresponding map tiles, consider the following example.

In this example embodiment, a client (e.g., apparatus 50) may issue or send a query to a network entity (e.g., network device 90) for a tile at zoom level 10 in which a corresponding map may have a maximum zoom level of 18. As such, the database converter 97 may perform the following:

SELECT*FROM D WHERE x=100 AND y=200 AND zoom=10

In other words, the database converter 97 may select each record R from a geographic database D that may have geometry data (e.g. in a geometry field) corresponding to an x value (e.g., the coordinate) of 100, a y value (e.g., the coordinate) of 200 and a zoom value of 10.

In this regard, the database converter 97 of the network device 90 may first compute or determine the equivalent block of tiles at zoom level 18 for this tile corresponding to a zoom level of 10 where x=100, y=200, zoom=10. Zoom level 18 may be used because the geographical records in a map tile database may be represented as zoom level 18 tiled records (since the maximum zoom level for a corresponding map may be 18, in this example).

The database converter 97 may apply the equations described above with respect to FIG. 5 to this example to compute the following:

$x_1=100, y_1=200, z_1=10, z_2=18$ $z_2-z_1=8$ (e.g., $18-10=8=z$)

$x_2=1600$ (e.g., $2\times8\times100=1600$), $y_2=3200$ (e.g., $2\times8\times200=3200$), $n=m=15$ (e.g., $2\times8-1=15$), $x_2+n=1615$ (e.g., $1600+15=1615$), $y_2+m=3215$ (e.g., $3200+15=3215$).

Referring now to FIG. 6, based on the above calculations, the database converter 97 may generate the tile block at zoom level 18 that is equivalent to the zoom level 10 in which x=100, y=200, zoom=10. For instance, the tile block of FIG. 6 shows that $x_2=1600$, $y_2=3200$, $x_2+n=1615$, $y_2+m=3215$, etc. In this regard, the database converter 97 may determine a rectangular tile block $B_1$ obtained in response to expanding the tile at zoom level 10 into zoom level 18.

After computing the equivalent tiles at zoom level 18, the database converter 97 of the network device 90 may convert the initial query Q sent by a client (e.g., apparatus 50) into a new query $Q_1$ where the x and y values are now based on a zoom level of 18. Based on the example above, this new query $Q_1$ may be denoted as follows:

SELECT*(e.g., select each record(s)) from $D_1$ WHERE $U_{left} \leq xmax$ AND $U_{right} \geq xmin$ AND $U_{top} \leq ymax$ AND $U_{bottom} \geq ymin$, which yields the following when applied to this example:

SELECT*FROM $D_1$ WHERE $1600 \leq xmax$ AND $1615 \geq xmin$ AND $3200 \leq ymax$ AND $3215 \geq ymin$.

As such, this new query $Q_1$ may be provided by the database converter 97 to the new or modified geographical database (e.g., database 93) having map tile data generated based in part on geometric data, in the manner described above. In this regard, the query $Q_1$ may be utilized to return all geographical records in the new or modified geographic database whose loose tile blocks intersect with the tile block in the new query $Q_1$. In this manner, the geographical records 1, 2 and 3 may be returned to the network device 90 since their tile blocks 80 (also referred to herein as loose tile block 80), 82, 84, respectively, intersect with the new query $Q_1$ tile block 87, as shown in FIG. 7.

Referring to FIG. 7, a map illustrating rectangular blocks to define each geographical record even though the geometry of a geographical record may not actually intersect every tile in the corresponding rectangular tile block is provided. The benefit of this example embodiment may be that it may allow an efficient tile representation of geographical records by using the range of tiles in that block as opposed to having a more accurate definition that may require listing every tile that the geometry of a corresponding record(s) intersects. Consider a case in which the geometry of a record(s) may intersect 1000 random tiles. Instead of maintaining a list of the 1000 tiles for that record, the exemplary embodiments may always use four numbers defining the minimum x and y tile values and the maximum x and y tile values.

With respect to the example above, the database converter 97 may receive the results from the new query $Q_1$ that was provided by the database converter 97 to the new or modified geographical database (e.g., database 93). The database converter 97 may then inspect the geometry (e.g., latitude coordinates and longitude coordinates associated with geometric data (e.g., points, lines, polygons, etc.)) corresponding to each record in the results to determine if the geometry actually interests the tile block 87 in the new query $Q_1$. As shown in FIG. 7, the database converter 97 may determine that the geometries of geographical records 2 and 3 intersect the query tile block 87. However, the database converter 97 may also determine that although the loose tile block 80 corresponding to geographical record 1 intersects the query tile block 87, the actual geometry corresponding to geographical record 1 does not intersect the query tile block 87. As such, the database converter 97 may remove geographical record 1 from the results retrieved from the new or modified geographical database and may only provide geographical records 2 and 3 to the client (e.g., apparatus 50) that initially sent the query Q to the network device 90. It should be pointed out that geographical record 4 is not retrieved from the database in this example embodiment since the associated loose tile block 85 does not intersect the query tile block 87.

Referring again to FIG. 7, the database converter 97 may determine that the tile blocks 80, 82, 84 and 85 are rectangular blocks $B_2$ that are the loose tile representations of the geographical records in the modified database 93. In an instance in which the converter 97 determines that a tile block $B_1$ (e.g., query tile block 87) intersects a given tile block $B_2$ (e.g., a loose tile block $B_2$) then the geographical records associated with the corresponding rectangular tile blocks $B_2$ may be returned by the database to the database converter 97 of the network device 90 (e.g., a server). In this regard, the database converter may analyze the results of the query $Q_1$ and may remove any record(s) whose geometry does not actually intersect query tile block $B_1$ before returning the results to the client (e.g., apparatus 50).

Referring now to FIG. 8, an exemplary method for converting geographical content corresponding to geometric data in a geographical database to one or more map tiles is provided. At operation 800, an apparatus (e.g., network device 90) may analyze geometrical data (e.g. points, lines, polygons, etc.) corresponding to a plurality of records of a geographic database (e.g., database 93). The geometrical data may be included in a column of the geographical database associated with corresponding records. The geometrical data may be associated with coordinates such as, for example, latitude and longitude coordinates. At operation 805, the apparatus (e.g., network device 90) may modify the geographical database by adding a plurality of items of data arranged in a plurality of receptive fields based in part on analysis of one or more values corresponding to geometry data associated with each of the records. The fields may correspond to respective columns (e.g., xmin, ymin, xmax, ymax) of the modified geographic database.

At operation 810, an apparatus (e.g., network device 90) may determine a set of tiles, for each of the records, at a predetermined zoom level that may include at least a portion of geometrical data of respective records. The predetermined zoom level may correspond to a maximum zoom level of a corresponding map (e.g., a maximum zoom level of 18). At operation 815, the apparatus may update each of the records of the geographical database to include data associated with minimum and maximum x and y values (e.g., R.xmin, R.ymin, R.xmax, R.ymax) of the tiles of the set that correspond to the geometrical data of respective records. Optionally, at operation 820, the apparatus may determine, for each of the records in the modified geographical database, that the minimum and maximum x and y values define a rectangular block of map tiles that is a superset of the set of tiles that includes at least a portion of geometrical data of respective records. In this regard, the apparatus may utilize at least one of the rectangular block of map tiles to determine whether to provide data associated with at least one geographical record to a device (e.g., apparatus 50) in response to receipt of a query (e.g., query Q). The apparatus may determine to provide the geographical record(s) to a device in an instance in which the geometry data associated with the geographical record(s) intersects the tile referenced in the query received from the device.

Referring now to FIG. 9, an exemplary method is provided for executing one or more queries on the modified database according to an example embodiment. At operation 900, an apparatus (e.g., network device 90) may receive a query (e.g., query Q) from a device (e.g., apparatus 50) in which the query may include data associated with a tile corresponding to x and y values and a zoom level corresponding to the tile. At operation 905, the apparatus may determine a plurality of equivalent tiles, corresponding to the tile in the query, at a maximum zoom level based in part on the zoom level for the tile in the query. At operation 910, the apparatus may convert the query into a new query (e.g., query $Q_1$) comprising x and y values corresponding to the maximum zoom level.

At operation 915, the apparatus may provide the new query to the modified database (e.g., database 93) requesting retrieval of each geographical record associated with tile blocks that intersect with the tile block identified in the new query. At operation 920, the apparatus may receive results of the new query indicating one or more geographical records associated with tile blocks intersecting the tile block in the new query. The results of the new query may be received from the modified geographical database. At operation 925, the apparatus may analyze the one or more geographical records to determine which geographical record(s) is associated with geometry data that intersects the tile block identified in the new query. At operation 930, the apparatus may remove any of the one or more geographical records from the results that are determined to be associated with geometry data that does not intersect the tile block in the new query. At operation 935, the apparatus may provide the results to a device (e.g., apparatus 50) in which the results may indicate at least one of the geographical records with geometry data that intersects the tile block in the new query.

It should be pointed out that FIGS. 8 and 9 are flowcharts of systems, methods and computer program products according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 96) and executed by a processor (e.g., processor 94, database converter 97). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 8 and 9 above may comprise a processor (e.g., the processor 94, the database converter 97) configured to perform some or each of the operations (800-820 and 900-935) described above. The processor may, for example, be configured to perform the operations (800-820 and 900-935) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (800-820 and 900-935) may comprise, for example, the processor 94 (e.g., as means for performing any of the operations described above), the database converter 97 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   modifying, via a processor, a geographical database based in part on adding a plurality of items of data arranged in a plurality of fields based on analyzing one or more values corresponding to geometry information associated with each of a plurality of geographical records of the geographical database;
   determining a set of tiles, for each of the records, at a predetermined zoom level that comprises at least a portion of the geographical information of respective records;
   updating each of the records to include data associated with minimum and maximum x and y values of the tiles that correspond to the geometrical information of a corresponding record; and
   determining that the minimum and maximum x and y values define one or more rectangular blocks of map tiles.

2. The method of claim 1, further comprising:
   utilizing at least one of the rectangular blocks of map tiles to determine whether to provide data associated with at least one of the geographical records to a device in response to receipt of a query.

3. The method of claim 1, wherein:
   the fields comprise respective columns, wherein,
   a first column of the columns corresponds to a minimum x value of all tiles at the predetermined zoom level that comprises at least a portion of geometrical data of the records,
   a second column of the columns corresponds to a minimum y value of all tiles at the predetermined zoom level that comprises at least a portion of the geometrical data of the records,
   a third column of the columns corresponds to a maximum x value of all the tiles at the predetermined zoom level that comprises at least a portion of the geometrical data of the records, and a fourth column of the columns corresponds to a maximum y value of all the tiles at the predetermined zoom level that comprises at least a portion of the geometrical data of the records; and the geometrical information comprises data associated with at least one of a latitude or longitude coordinate associated with a location of a place or object in the real world.

4. The method of claim 1, further comprising:

receiving a query for data from a device, the query comprises content corresponding to at least one tile associated with x and y values and a zoom level corresponding to the tile; and determining a plurality of equivalent tiles, corresponding to the at least one tile, at a maximum zoom level based in part on the zoom level for the tile.

5. The method of claim 4, further comprising:

converting the query to a new query comprising the x and y values corresponding to the maximum zoom level; and enabling provision of the new query to the modified geographical database requesting retrieval of each geographical record associated with one or more tile blocks that intersect a tile block identified in the new query.

6. The method of claim 5, further comprising:

receiving results corresponding to the new query, from the modified geographic database, indicating one or more of the geographical records associated with one or more tile blocks that intersect a portion of the tile block identified in the new query.

7. The method of claim 6, further comprising:

analyzing data associated with the one or more geographical records to determine whether each of the one or more geographical records comprise geometry content that intersects the tile block identified in the new query.

8. The method of claim 7, further comprising:

enable removal of any of the one or more geographical records from the results that are determined to be associated with geometry content that does not intersect the tile block identified in the new query.

9. The method of claim 8, further comprising:

enabling provision of the results to a device, the results comprising indicia indicating at least one of the geographical records with corresponding geometry data that intersects the tile block identified in the new query.

10. An apparatus comprising:

at least one processor; and at least one memory including computer program code, the at least one memory and the computer program code configured to, with the at least one processor cause the apparatus to perform at least the following:

modify a geographical database based in part on adding a plurality of items of data arranged in a plurality of fields based on analyzing one or more values corresponding to geometry information associated with each of a plurality of geographical records of the geographical database;

determine a set of tiles, for each of the records, at a predetermined zoom level that comprises at least a portion of the geographical information of respective records;

update each of the records to include data associated with minimum and maximum x and y values of the tiles that correspond to the geometrical information of a corresponding record; and determine that the minimum and maximum x and y values define one or more rectangular blocks of map tiles.

11. The apparatus of claim 10, wherein the at least one memory and the computer program code are further configured to, with the processor, cause the apparatus to:

utilize at least one of the rectangular blocks of map tiles to determine whether to provide data associated with at least one of the geographical records to a device in response to receipt of a query.

12. The apparatus of claim 10, wherein:

the fields comprise respective columns, wherein, a first column of the columns corresponds to a minimum x value of all tiles at the predetermined zoom level that comprises at least a portion of geometrical data of the records, a second column of the columns corresponds to a minimum y value of all tiles at the predetermined zoom level that comprises at least a portion of the geometrical data of the records, a third column of the columns corresponds to a maximum x value of all the tiles at the predetermined zoom level that comprises at least a portion of the geometrical data of the records, and a fourth column of the columns corresponds to a maximum y value of all the tiles at the predetermined zoom level that comprises at least a portion of the geometrical data of the records; and the geometrical information comprises data associated with at least one of a latitude or longitude coordinate associated with a location of a place or object in the real world.

13. The apparatus of claim 10, wherein the at least one memory and the computer program code are further configured to, with the processor, cause the apparatus to:

receive a query for data from a device, the query comprises content corresponding to at least one tile associated with x and y values and a zoom level corresponding to the tile; and determine a plurality of equivalent tiles, corresponding to the at least one tile, at a maximum zoom level based in part on the zoom level for the tile.

14. The apparatus of claim 13, wherein the at least one memory and the computer program code are further configured to, with the processor, cause the apparatus to:

convert the query to a new query comprising the x and y values corresponding to the maximum zoom level; and enable provision of the new query to the modified geographical database requesting retrieval of each geographical record associated with one or more tile blocks that intersect a tile block identified in the new query.

15. The apparatus of claim 14, wherein the at least one memory and the computer program code are further configured to, with the processor, cause the apparatus to:

receive results corresponding to the new query, from the modified geographical database, indicating one or more of the geographical records associated with one or more tile blocks that intersect a portion of the tile block identified in the new query.

16. The apparatus of claim 15, wherein the at least one memory and the computer program code are further configured to, with the processor, cause the apparatus to:

analyze data associated with the one or more geographical records to determine whether each of the one or more geographical records comprise geometry content that intersects the tile block in the new query.

17. The apparatus of claim 16, wherein the at least one memory and the computer program code are further configured to, with the processor, cause the apparatus to:

enable removal of any of the one or more geographical records from the results that are determined to be associated with geometry content that does not intersect the tile block identified in the new query.

18. The apparatus of claim 17, wherein the at least one memory and the computer program code are further configured to, with the processor, cause the apparatus to:

enable provision of the results to a device, the results comprising indicia indicating at least one of the geographical records with corresponding geometry data that intersects the tile block identified in the new query.

19. A computer program product comprising at least one computer-readable storage medium having computer-readable program code portions stored therein, the computer-readable program code portions comprising:

program code instructions configured modify a geographical database based in part on adding a plurality of items of data arranged in a plurality of fields based on analyzing one or more values corresponding to geometry information associated with each of a plurality of geographical records of the geographical database;

program code instructions configured to determine a set of tiles, for each of the records, at a predetermined zoom level that comprises at least a portion of the geographical information of respective records;

program code instructions configured to update each of the records to include data associated with minimum and maximum x and y values of the tiles that correspond to the geometrical information of a corresponding record; and program code instructions configured to determine that the minimum and maximum x and y values define one or more rectangular blocks of map tiles.

20. The computer program product of claim 19, further comprising:

program code instructions configured to utilize at least one of the rectangular blocks of map tiles to determine whether to provide data associated with at least one of the geographical records to a device in response to receipt of a query.

* * * * *

UNITED STATES PATENT AND TRADEMARK OFFICE
CERTIFICATE OF CORRECTION

PATENT NO. : 8,352,480 B2
APPLICATION NO. : 12/973514
DATED : January 8, 2013
INVENTOR(S) : Iwuchukwu Page 1 of 1

It is certified that error appears in the above-identified patent and that said Letters Patent is hereby corrected as shown below:

In the Specifications:

Column 14,
Line 40, "the coordinate", both occurrences, should read --tile coordinate--.

Signed and Sealed this
Twentieth Day of August, 2013

Teresa Stanek Rea
*Acting Director of the United States Patent and Trademark Office*